F. ANSLEY.
STRAINER TOP FOR MILK PAILS.
APPLICATION FILED DEC. 3, 1910.
989,752.
Patented Apr. 18, 1911.
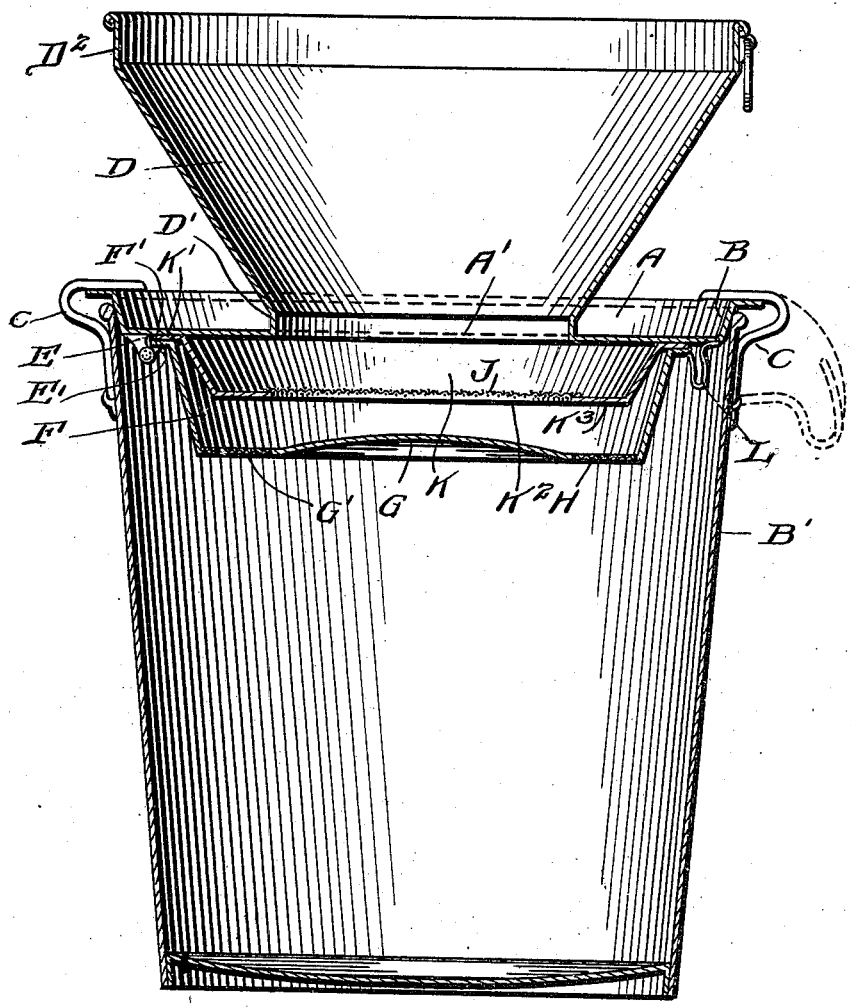
Witnesses
Geo. L. Thom
A. C. Blakeney.
Inventor
Frank Ansley.
By Franklin H. Hough
Attorney

UNITED STATES PATENT OFFICE.

FRANK ANSLEY, OF SPOKANE, WASHINGTON.

STRAINER-TOP FOR MILK-PAILS.

989,752.

Specification of Letters Patent.

Patented Apr. 18, 1911.

Application filed December 3, 1910. Serial No. 595,496.

*To all whom it may concern:*

Be it known that I, FRANK ANSLEY, a citizen of the United States, residing at Spokane, in the county of Spokane and State of Washington, have invented certain new and useful Improvements in Strainer-Tops for Milk-Pails; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in strainer tops for milk pails and the object of the invention is to produce a simple and efficient device of this nature which may exclude all foreign matter from the milk and cool the milk somewhat before it reaches the pail.

My invention comprises various details of construction and arrangements of parts which will be hereinafter fully described and then specifically defined in the appended claims.

In the drawing, I have illustrated a vertical central sectional view through my improved strainer tops for milk pails.

Reference now being had to the details of the drawing by letter, A designates the upper tray having a circumferential flange B which tapers and is adapted to frictionally engage the inner marginal edge of a milk tray, which in the drawing is designated by letter B'. Ears C are hinged to the pail and are adapted to engage over the horizontal flange of the tray A for the purpose of holding the tray within the pail and also serving as means for supporting the pail while a person having a strainer attached to the pail milks. The central portion of the tray A has an opening A', and D designates a funnel-shaped member having a cylindrical flanged portion D' about its lower end and which is fastened to the bottom of the tray A about the marginal edge of the opening A' therein. A similar cylindrical flange $D^2$ is formed about the upper marginal edge of said member and serving as means for preventing the milk spraying or spattering out of said member.

Projecting from the under surface of the tray A is an arm E to which an arm E' is hinged, which latter is fastened to the flange of the tray F. Said tray F has a flange F' about its marginal edge upon which the flange K' of the tray K is adapted to rest when the parts are adjusted in position for use. The tray K has a central opening $K^2$ which is of a diameter substantially the same as that of the opening A' and directly underneath the latter. A screen J covers the opening $K^2$; about the marginal edge of said screen is a solid portion of the bottom $K^3$. The bottom of the tray F has a central convexed portion G which is imperforate and about the marginal edge of the latter is a series of holes G' covered by screens H. A spring latch L is fastened to the bottom of the tray A and is adapted to engage the flange F' of the receptacle F to hold the trays in the positions shown in the drawing in which illustration it will be noted that the flange of the intermediate tray K is held in contact with the under surface of the tray A, being clamped and securely held in the position shown.

In operation, the parts are adjusted as shown in the drawing for use and secured to a milk pail. The tapering portion of the funnel-shaped member may be held between the knees of the operator in the usual manner in milking and, as the milk passes through the opening in said member, it comes in contact with the screen J which will separate foreign matter therefrom and which will be washed off the screen J upon the solid portion of the bottom of the tray K. The milk as it sprays through the screen will fall upon the convexed portion G of the bottom of the tray F and, draining down in different directions, will run through the screen covered openings G' in the bottom of the tray F to the pail beneath, thus serving to cool the milk as well as separate foreign substances therefrom. It will be noted that, as the funnel-shaped member is frictionally held by the knees of the person milking, the pail will be supported by the hooks thereon engaging over the upper edge of the tray.

For cleansing or separating the trays, the latch L may be detached from the flange of the tray F to give access to the same.

What I claim to be new is:—

1. A strainer top for milk pails comprising two trays which are hinged together, one of said trays adapted to frictionally engage a milk pail to hold the same in place and having an opening in its bottom, with a conical-shaped member about said opening, an intermediate tray held between the two trays which are hinged together and provided with a screened opening in the bottom thereof, the lower of the hinged trays having openings therein.

2. A strainer top for milk pails comprising two trays which are hinged together, one of said trays adapted to frictionally engage a milk pail to hold the same in place and having an opening in its bottom, with a conical-shaped member about said opening, an intermediate tray held between the two trays which are hinged together and provided with a screen covered opening underneath the opening in the upper tray and provided with imperforate portion about said screened opening, the under tray having a screen covered opening.

3. A strainer top for milk pails comprising two trays which are hinged together, one of said trays adapted to frictionally engage a milk pail to hold the same in place and having an opening in its bottom, with a conical-shaped member about said opening, an intermediate tray held between the two trays which are hinged together and provided with a screen covered opening underneath the opening in the upper tray and provided with an imperforate portion about said screened opening, the under tray having a central convexed portion and series of screen covered openings about the marginal edge of said convexed portion.

4. A strainer top for milk pails comprising two trays hinged together, a screen covered opening in one of said trays, the upper of the trays adapted to frictionally engage the marginal edge of a milk pail to support the trays, the upper of the trays having an opening in its bottom, a conical-shaped member secured to the marginal edge of said opening, the lower tray provided with a bottom having a central convexed part, the flat portion of the bottom about said convexed part being provided with screen covered openings, an intermediate flanged tray resting upon the flange of the lower of the hinged trays and having a central screen covered opening, and a latch adapted to engage the flange of the lower tray and hold the flange of the intermediate tray against the bottom of the upper tray.

5. A strainer top for milk pails comprising two trays hinged together, a screen covered opening in one of said trays, the upper of the trays adapted to frictionally engage the marginal edge of a milk pail to support the trays, the upper of the trays having an opening in its bottom, a conical-shaped member secured to the marginal edge of said opening, the lower tray provided with a bottom having a central convexed part, the flat portion of the bottom about said convexed part being provided with screen covered openings, an intermediate flanged tray resting upon the flange of the lower of the hinged trays and having a central screen covered opening, a latch adapted to engage the flange of the lower tray and hold the flange of the intermediate tray against the bottom of the upper tray, and means for securing the device to a pail.

6. A strainer top for milk pails comprising trays hinged together, the upper of which is adapted to frictionally engage a milk pail and provided with a central opening, a funnel-shaped member having a cylindrical portion at its lower end fastened about the marginal edge of said opening, the upper end of the funnel-shaped portion being cylindrical, the lower of the hinged trays having a convexed bottom, a series of screen covered openings about the same, an intermediate tray held between the hinged trays and having a screen covered opening underneath the opening in the upper tray, and means for holding the trays together.

7. In combination with a milk pail, a strainer top comprising two trays hinged together, the upper of the trays adapted to frictionally engage the pail, hooks pivotally mounted upon the pail and engaging over the edge of the upper tray, forming means for supporting the pail when milking, the upper tray having an opening, a funnel-shaped member secured to the upper tray about the opening therein, the bottom tray provided with screen covered openings and a central convexed part, an intermediate tray with a central screen covered opening held intermediate the hinged trays, and means for holding the trays together.

In testimony whereof I hereunto affix my signature in the presence of two witnesses.

FRANK ANSLEY.

Witnesses:
W. F. FOSTER,
ED. P. TARRELL.

---

Copies of this patent may be obtained for five cents each, by addressing the "Commissioner of Patents, Washington, D. C."